(12) United States Patent
Hindawi et al.

(10) Patent No.: US 8,086,729 B1
(45) Date of Patent: Dec. 27, 2011

(54) DISTRIBUTED STATISTICAL DETECTION OF NETWORK PROBLEMS AND CAUSES

(75) Inventors: David Hindawi, Berkeley, CA (US);
Orion Hindawi, Berkeley, CA (US);
Lisa Lippincott, Berkeley, CA (US);
Peter Lincroft, Berkeley, CA (US)

(73) Assignee: Tanium Inc., Berkeley, CA (US)

( * ) Notice: Subject to any disclaimer, the term of this patent is extended or adjusted under 35 U.S.C. 154(b) by 108 days.

(21) Appl. No.: 12/412,623

(22) Filed: Mar. 27, 2009

Related U.S. Application Data

(60) Provisional application No. 61/113,060, filed on Nov. 10, 2008.

(51) Int. Cl.
*G06F 15/173* (2006.01)
(52) U.S. Cl. ........................................................ 709/224
(58) Field of Classification Search ........... 709/223–224
See application file for complete search history.

(56) References Cited

U.S. PATENT DOCUMENTS

| | | | | |
|---|---|---|---|---|
| 6,049,828 A | * | 4/2000 | Dev et al. | 709/224 |
| 7,555,545 B2 | * | 6/2009 | McCasland | 709/224 |
| 7,600,018 B2 | * | 10/2009 | Maekawa et al. | 709/224 |
| 7,761,557 B2 | * | 7/2010 | Fellenstein et al. | 709/224 |
| 2005/0108389 A1 | * | 5/2005 | Kempin et al. | 709/224 |
| 2008/0263031 A1 | * | 10/2008 | George et al. | 707/5 |
| 2008/0288646 A1 | * | 11/2008 | Hasha et al. | 709/228 |

* cited by examiner

*Primary Examiner* — Hussein A. Elchanti
(74) *Attorney, Agent, or Firm* — Swernofsky Law Group PC

(57) ABSTRACT

In a network, a set of machines communicate pairwise, each conditionally adjusting messages in response to its own local state, and each in response to statistical methods conditionally propagating those messages, with the effect that problems with that network, or with a subset of its machines, are reported to a receiver/server. Only a substantially constant number of reports are made to the receiver/server, even when there are a substantial number of such machines able to detect that problem. When a problem is reported, a similar technique causes the machines to collectively evaluate and report suggested causes for that problem. Messages are propagated from each machine to another using locally random global locality. The machines in the network, in response to statistical techniques, organize hierarchically in O(log n) time, where n is the number of machines in the network, substantially without any requirement for nonlocal message exchange.

9 Claims, 3 Drawing Sheets

US 8,086,729 B1

DISTRIBUTED STATISTICAL DETECTION OF NETWORK PROBLEMS AND CAUSES

CROSS REFERENCE TO RELATED APPLICATION

This application claims priority of U.S. Provisional Patent Application No. 61/113,060, filed Nov. 10, 2008 in the name of the same inventors, titled "Distributed Statistical Detection of Network Problems and Causes," and is hereby incorporated by reference as if fully set forth herein.

BACKGROUND

In a network of communicating machines, such as for example an enterprise network or other computer network, the number of possible problems, and the amount of data available regarding those possible problems, grows rapidly with the size of that network. However, the amount of communication bandwidth available to report that data, and the amount of computing power available to analyze that data to determine which—if any—of those possible problems is currently occurring, is not so freely available. Known systems have the drawback that they are unable to communicate or process that amount of information sufficiently quickly, with the effect that their problem reporting is substantially delayed, and their ability to determine problem causes is relatively weak.

DETAILED DESCRIPTION

Generality of Description

Figure 1:
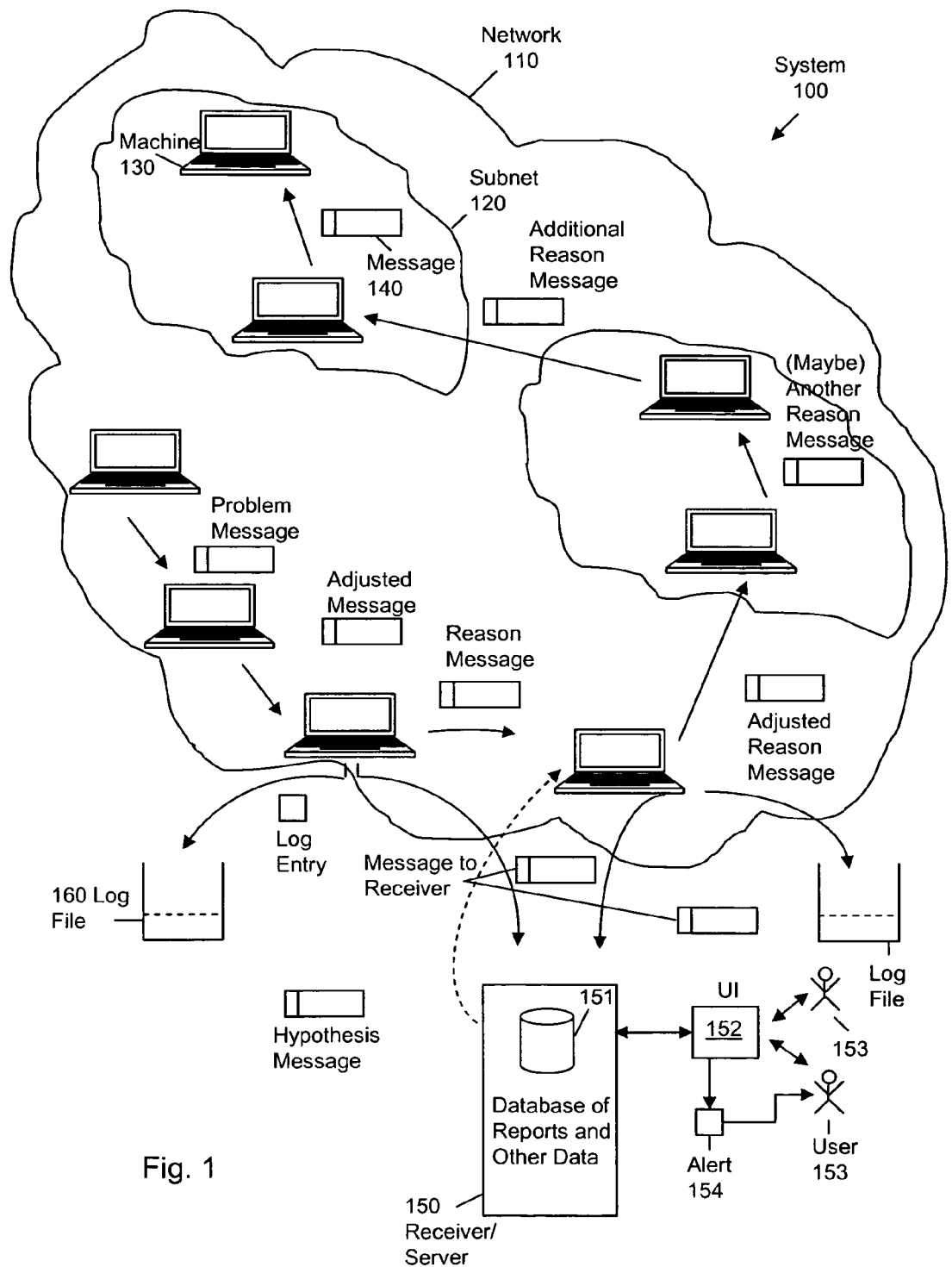
FIG. 1 shows a conceptual drawing of a system.

This application should be read in the most general possible form. This includes, without limitation, the following:
  References to specific techniques include alternative and more general techniques, especially when discussing aspects of the invention, or how the invention might be made or used.
  References to "preferred" techniques generally mean that the inventor contemplates using those techniques, and thinks they are best for the intended application. This does not exclude other techniques for the invention, and does not mean that those techniques are necessarily essential or would be preferred in all circumstances.
  References to contemplated causes and effects for some implementations do not preclude other causes or effects that might occur in other implementations.
  References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

TERMS AND PHRASES

As used herein, the following terms and phrases have these described general meanings. These meanings are intended to be exemplary, not limiting.
  machine—generally indicates a device of any kind, capable of performing either the communicating or the computing tasks ascribed herein
  message—generally indicates a signal of any kind, capable of being sent from one machine and received by another; in one embodiment, a message includes a sequence of symbols including a header, a destination address, and data payload
  adjusting a message—generally indicates any kind of change, rewrite, or alteration to that message, including to a copy of that message which is ultimately sent
  local state—generally indicates status of any kind, capable of being recognized by a particular machine; for example, whether the machine is relatively burdened computationally would be an example of a part of its local state, as would be whether a machine is able to send and receive messages to its neighbors. (Note that "local state" is used to refer to and include any information available to the machine whose "local state" is examined.)
  statistical measure—generally indicates use of a technique of any kind, in which individual behavior of particular machines is regarded as relatively less important than an aggregate behavior of a set of machines; for example, a 95% confidence that a problem is occurring on more than 300 machines would be an example of a statistical measure
  passing messages onward—generally indicates use of a technique of any kind, in which a message, report, or signal is propagated from a deciding machine to another machine; in one embodiment, each message indicating a possible problem or a possible cause of a problem is not maintained at any of its sending machines, but is either passed onward or deleted in response to a statistical measure
  local messages—generally indicates use of a technique of any kind, in which a message, report, or signal is propagated from substantially one machine to another; in one embodiment, local messages are distinguished from "global" communication, in which a single machine or set of machines tries to determine a state of a network involving a substantial plurality of such machines
  probabilistic activity—generally indicates an activity that includes the use of a random or pseudorandom technique of any kind
  client and server—generally refer to a relationship between devices or applications. One "client" or one "server" can comprise any of the following: (a) a single physical device capable of executing software; (b) a portion of a physical device, such as a software process or set of software processes capable of executing on one hardware device; or (c) a plurality of physical devices, or portions thereof, capable of cooperating to form a logical entity.

FIGURES AND TEXT

FIG. 1
System Elements
  FIG. 1 shows a conceptual drawing of a system 100, including elements shown in the figure, and including at least a network 110, one or more subnets 120, one or more machines 130, one or more messages 140, one or more receiver/servers 150 (sometimes referred to herein as "receivers" or as "servers"), and one or more log files 160.

The network 110 possibly includes one or more subnets 120. For example and without limitation, the network 110 might include (or be included as part of, or otherwise intersect) an enterprise network, in which one or more of the subnets might include (or be included as part of, or otherwise intersect) individual campus-wide networks within that enterprise network. However, in the context of the invention, there is no particular requirement that the subnets 120 are proper subsets of the network 110. For example and without limitation, one or more subnets 120 might intersect the network 110 with at least some machines 130, while having other machines 130 not part of the network 110 or perhaps not even coupled to the network 110.

Also, in the context of the invention, there is no particular requirement that the subnets 120 are physically separated or otherwise physically distinct within the network 110. For example and without limitation, one or more subnets 120 might represent separation in response to distinct departments within an enterprise (whether a business, university, or otherwise), e.g., a distinction between "accounting" and "engineering", distinct functional separation (or distinct primary functional separation), e.g., a distinction between desktop computers and mobile telephones, distinct logical separation, e.g., a distinction in response to which VLAN a machine 130 is assigned, or otherwise. This has the effect that one or more subnets 120 might overlap, either in the sense that they occupy overlapping regions of space, or in the sense that they include common devices which are assigned to one or another subnet 120 as appropriate.

The system 100 includes one or more machines 130 coupled thereto, some of which might be included in the one or more subnets 120 and some of which might not be so included. Most (but not necessarily all) machines 130 are capable of at least generating one or more messages 140. Most (but not necessarily all) machines 130 are capable of receiving one or more such messages 140 and sending one or more such messages 140.

As shown herein, messages 140 include information which can be used to diagnose one or more states of the system 100. Those states of the system 100 described as "problems" need not necessarily indicate errors or problems; they can be good, bad, or simply informative with respect to the system 100. Those states of the system 100 described as "causes" or "joint causes" need not necessarily indicate actual causality or links; they can be correlated, anti-correlated, or otherwise informative with respect to the system 100. However, for simplicity and without limitation, these states of the system 100 are sometimes referred to herein as "problems", "causes", or other descriptions.

In the context of the invention, there is no particular requirement that all machines 130 include computing devices, although this might be typical of one or more implementations of the system 100. For example and without limitation, one or more machines 130 might include peripheral devices such as printers, sensor devices such as thermometers, or other devices capable of generating one or more messages 140, but not necessarily capable of receiving such messages 140 or of performing any computation. Also, in the context of the invention, there is no particular requirement that all machines 130 are capable of generating messages 140; some machines 130 might merely be capable of receiving and processing such messages 140. For example and without limitation, one or more machines 130 might include network bridges or routers, or might include router monitors, or other such devices.

As described herein, one or more machines 130 might be operatively coupled to communicate. This communication can be one-way (as for example without limitation, if one such machine 130 is disposed only for generating messages 140), or twoway (as for example without limitation, if both such machines 130 include computing devices. Although the system 100 is primarily described herein with respect to such communication being from a first such single machine 130 to a second such single machine 130, in the context of the invention, there is no particular requirement that communication is so limited. While the system 100 does not need to make use (or where used, substantially extensive use) of multicast communication, in the context of the invention, there is no particular requirement that all communication is unicast; one or more such machines 130 might be operatively coupled to perform multicast communication, whether some of the time, all of the time, only upon selected conditions, or otherwise. As described herein, communication between machines is therefore generally pairwise, although other techniques are equally applicable without either undue experiment or further invention, and are within the scope and spirit of the invention.

As described herein, communication between machines 130 might occur from a first such machine 130 to a second such machine 130 both within a subnet 120, or might occur in cases in which that first such machine 130 and that second such machine 130 are not both within a subnet 120. For example and without limitation, communication might occur entirely within a subnet 120, from inside a subnet 120 to outside a subnet 120, from outside a subnet 120 to inside a subnet 120, entirely outside any subnets 120, or otherwise.

As described herein, under certain circumstances, the receiver/servers 150 might send one or more messages 140 into the network, designating one or more machines 130 as recipients thereof. For example and without limitation, if one of the receiver/servers 150 suspects that a particular problem is likely to be prevalent, but has not yet been so reported, that receiver/server 150 might send a "problem" message 140 to one or more machines 130. This would have the effect of possibly confirming or denying that the suspected problem was in fact prevalent. Similarly, if one of the receiver/servers 150 suspects (of one or more problems), that a particular cause is likely to be associated with those problems, but has not yet been so reported, that receiver/server 150 might send a "reason" message 140 to one or more machines 130. Similarly, this would have the effect of possibly confirming or denying that the suspected cause was in fact associated with one or more of the stated problems.

Servers and Users

As described herein, one or more receiver/servers 150 are coupled to the network 110, and are capable of receiving messages 140 from machines 130 from within the network 110 (or from one or more subnets 120 intersecting the network 110). At least one of the one or more receiver/servers 150 includes a database 151, in which the receiver/servers 150 might maintain information received from those messages 140, or otherwise. One or more of the receiver/servers 150 might include a user interface 152, with which one or more authorized users 153 (for example and without limitation, network administrators for the network 110) might communicate with the receiver/servers 150. One or the forms of communication between the receiver/servers 150 and the authorized users 153 might include one or more alerts 154, communicated between the receiver/servers 150 and the authorized users 153.

For another example and without limitation, if, in a network with 100,000 nodes, if, say, 250 nodes have experienced a disk crash, one or more authorized users 153 might direct those 250 nodes (e.g., machines 130) to reboot without including the crashed disks in their respective configurations. Alternatively, for example and without limitation, one or more authorized users 153 might direct those 250 nodes (e.g., machines 130) to power down and await physical service.

After reading this application, those skilled in the art will recognize that, while the invention is primarily described with respect to a single receiver/server 150, it is possible to provide for more than one receiver/server 150, which might cooperate or not, which might provide redundancy or not, which might synchronize or otherwise coordinate databases 151 or not, and which might respond to a unified user interface 152 or not. Also, while the invention is described primarily with respect to cases in which authorized users 153 might perform any actions suitable for those who are authorized, in the context of the invention, there is no particular requirement for there to be a single level of authorization. For example and without limitation, some users 153 might be authorized only to review the state of the system 100 while other users 153 are authorized in addition to modify that state.

This has the effect that those one or more authorized users 153 might obtain information about the network 110 (or about one or more subsets 120 intersecting the network 110, or about one or more particular machines 130 coupled to the network). This also has the effect that those one or more authorized users 153 might take one or more actions that might affect the network 110 (or one or more subsets 120 intersecting the network 110, or one or more particular machines 130 coupled to the network). For example and without limitation, the authorized users 153 might obtain information about the network 110, from which those authorized users 153 might determine that action should be taken with respect to particular subnets 120 or particular machines 130. In such cases, the authorized users 153 might, using the receiver/servers 150 or otherwise, affect selected parameters of the network 110, or one or more particular subnets 120, or one or more particular machines.

The invention is broad enough to include the possibility that the authorized users 153 might send value assessments of the severity of particular problems (or types of problems), which the receiver/server 150 pushes back to each machine 130.

The invention is broad enough to include the possibility, consistent with the possibility noted just above and concurrently usable, that the authorized users 153 may inject reason messages 140 into the network 110, for reasons they think might be associated with problems that are reported to the receiver/server 150. Similarly, the receiver/server 150 may sua sponte inject reason messages 140 into the network 110, for reasons that the receiver/server 150 concludes are associated with problems that are reported to the receiver/server 150.

FIG. 2

Figure 2:
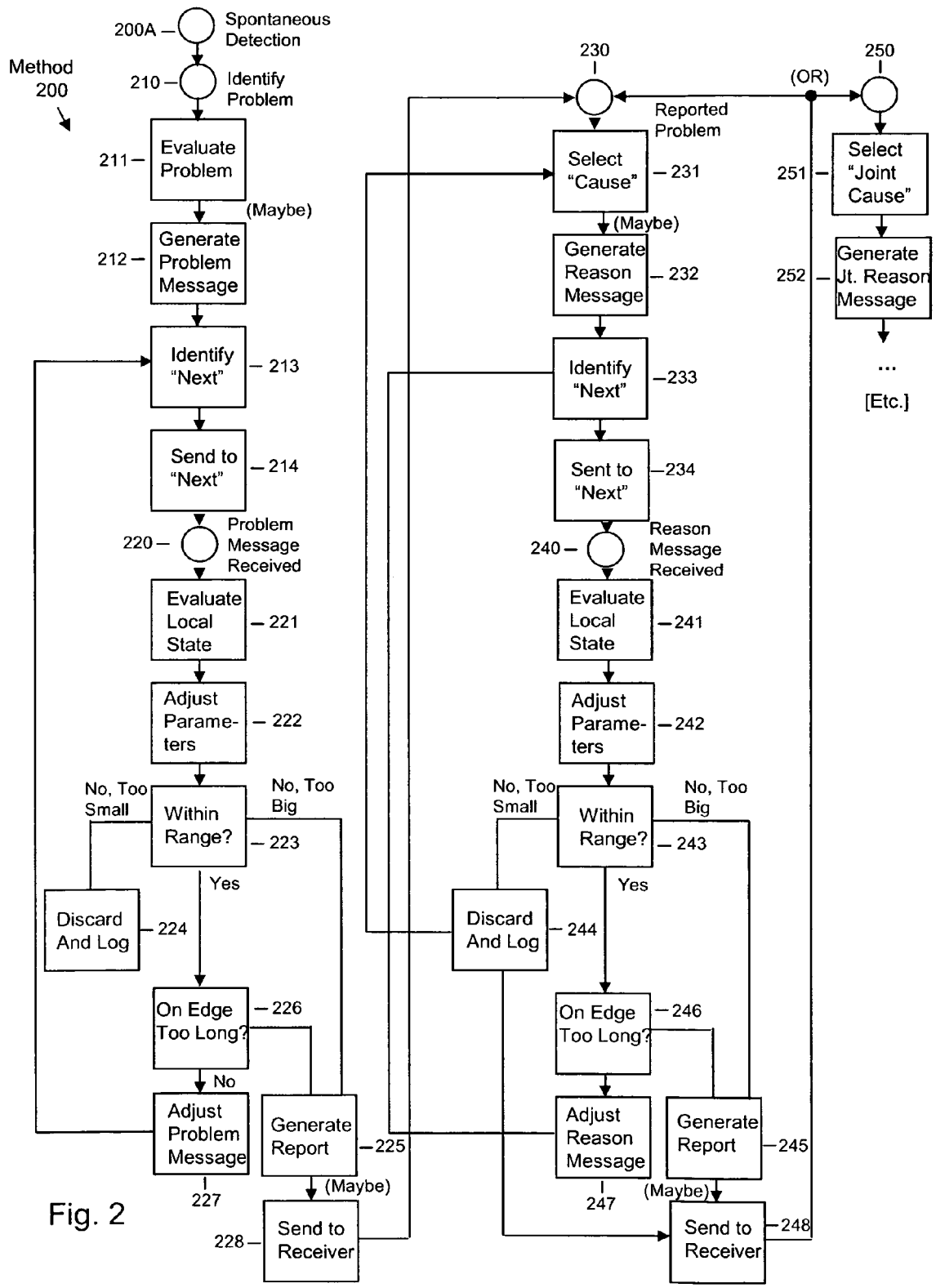
FIG. 2 shows a conceptual diagram of a method.

FIG. 2 shows a conceptual diagram of a method.

A method 200 includes a set of flow labels and method steps as shown in the FIG. 2, including at least:

Identifying Problems

A flow label 200A indicates that the method 200 might be initiated, at each machine 130, in response to spontaneous detection of a problem. However, the method 200 might alternatively be initiated, by each machine 130 or by selected machines 130, from time to time, e.g., periodically or randomly, some combination thereof, or in response to some other technique.

Also, although the steps of methods 200 falling within the scope and spirit of the invention are primarily performed in the order described herein, in the context of the invention, there is no particular requirement that those steps need be performed in any particular order. For example and without limitation, multiple machines 130 might operate in conjunction and cooperatively to perform the steps described herein in a quite different order, notwithstanding that some steps would otherwise appear to be required to be performed in particular orders.

At a flow label 210, the method 200 identifies a "problem" (e.g., identifies the problem at one or more machines 130), i.e., any fact about the network 110 for which it might be desirable to generate a message 140 for sending to the receiver/server 150. As noted herein, in the context of the invention, there is no particular requirement that a "problem" indicates something bad; rather, a "problem" message might indicate anything of interest, which might be something good or something neutral.

At a step 211, the method 200 evaluates the problem. This step need not be performed at the same machines 130 as those that identified the problem, but it is likely that those machines 130 which have greater access to information about the problem, e.g., those on which the problem occurred, would be assigned to evaluate that problem. For example and without limitation, the machine 130 performing the evaluation might determine any one or more of the following features of the problem, or some other features, or some combination thereof. In the context of this discussion, for the machine 130 to "determine" does not require that the machine 130 obtain an absolute and specific value for the particular feature, only that the machine 130 obtain at least some information (i.e., more than zero bits of information, even if only a partial bit) about that particular feature.

The machine 130 performing the evaluation might determine a measure of the prevalence of the problem. In the context of this measure, "prevalence" indicates a degree to which the problem affects selected machines 130 coupled to the network 110. This might be thought of as a probability that a machine 130, randomly selected from the network 110, has the particular problem, or might be thought of as a measure of the number of machines 130, in the network 110, which have this particular problem.

The machine 130 performing the evaluation might determine a measure of severity of the problem. In the context of this measure, "severity" might be a measure that is selected in response to conditions made known to the machine 130 by one or more authorized users 153. For example and without limitation, the severity of the problem might be determined in response to:

a likely cause of the problem, e.g., whether the problem was caused by a temporary condition of the network 110, e.g., congestion causing communication within the network 110 to be affected, whether the problem was likely caused by a software update of a program application, whether the problem was likely caused by a software update to an operating system function or similar program of general applicability, whether the problem was caused by a software bug, whether the problem was caused by a hardware error or a hardware update, or whether the problem was caused by some type of malware;

an amount of time the problem has been in evidence, e.g., whether the problem has been a problem for 5 seconds, 5 minutes, 5 hours, 5 days, or appears to be likely to continue forever if not fixed;

an amount of data the problem is likely to affect, e.g., only recent data, data from several hours or several days of operation, or data from an entire branch of the network 110, such as for example requiring re-imaging an entire bank branch and restarting with data from several days ago;

a degree of infectiousness of the problem, e.g., whether the problem is confined to those machines 130 which exhibit that problem, whether those machines 130 can randomly or spontaneously cause similar problems in related machines 130 to which they are coupled, or whether the problem appears to be actively spreading, such as pathogenic malware;

a degree of malevolence of the problem, e.g., whether the problem is accidental or inadvertent, a result of carelessness or sloppy installation or programming, or a feature of a program that is actively attempting to misuse or otherwise harm the network 110;

and the like.

The machine 130 performing the evaluation might determine a measure of damage to the network 110 likely caused by the problem. In the context of this measure, "damage" might be a measure that is selected in response to conditions made known to the machine 130 by one or more authorized users 153. For example and without limitation, the damage likely caused by the problem might be determined in response to:

slowness of particular application programs on selected machines 130;

slowness of all programs on selected machines 130;

lack of availability of particular application programs for some amount of time;

lack of availability of particular machines 130 for some amount of time;

lack of communication with small or large portions of one or more subnets 120 or of the network 110;

and the like.

The machine 130 identifying the problem and the machine 130 actually generating a problem message 140 regarding that problem need not necessarily be the same machine. Also, the machine 130 identifying the problem need not necessarily be the same machine 130 on which the problem is occurring. As described herein, each machine 130 generally has superior knowledge of its own state, i.e., each machine 130 can appreciate its own state without necessarily having to communicate with any other machine 130. This has the effect that any one machine 130 is likely to be superior at determining its own state, rather than others' state, and is likely to be the machine 130 best qualified to determine that same machine's 130 state, rather than others making that determination. Also, having each machine 130 determine its own state reduces the relative need for communication between or among machines 130 for the purpose of determining the state of one or more of those machines 130.

Accordingly, the invention is primarily described with respect to cases in which each machine 130 determines its own state, using information locally available, e.g., whether that machine 130 is using a relatively unusual amount of computing power or storage space, whether that machine 130 is able to sense network traffic, whether that machine 130 is able to receive responses to messages 140 it sends out, and the like. While the invention is primarily described with respect to such cases, in the context of the invention, there is no particular requirement for this. It is possible for machines 130 to determine a state for their neighbors, or for their local neighborhood, or more generally, for any other machine 130 (for example and without limitation, a second machine 130 for which the first machine 130 is assigned a "big brother" relationship), and by other techniques.

The method 200 determines, at each such machine 130, whether the features of the problem (e.g., its likely prevalence, severity, malevolence, or damage), or some combination thereof, warrant a report to the receiver/server 150. If so, the method 200 proceeds with the next step. If not, the method 200 might, at each such machine 130, either discard the problem or create a log entry for that problem.

At a step 212, the method 200 generates one or more problem messages 140. This step need not be performed at the same machines 130 as those that identified the problem, but it is likely that those machines 130 which have greater access to information about the problem, e.g., those on which the problem occurred, would be assigned to generate problem messages 140. To perform this step, the method 200 avails the following sub-steps:

At a sub-step 212(a), the method 200 determines, in response to the likely prevalence of the problem, the number of machines 130 which are presently considering generating problem messages 140. For example and without limitation, if the method 200 determines that 1% of 100,000 machines 130 are likely identifying the problem, it might conclude that approximately 1,000 such machines 130 are presently considering generating problem messages 140.

At a sub-step 212(b), the method 200 determines, in response to that number of machines 130, what probability should be assigned to each such machine 130, so that the number of problem messages 140 that are generated is most likely to be within selected threshold values. For example and without limitation, in the example described with respect to sub-step 212(a), the method 200 might determine that only 1% of those machines 130 that presently considering generating problem messages 140, should actually generate problem messages 140. In this example, if all those machines 130 generated problem messages 140, the receiver/server 150 might be swamped with 1,000 reports of the same problem. Similarly, in this example, if each machine 130 identifying the problem and considering sending a problem message does so with only a 1% probability (using a random or pseudo-random statistic), it is most likely that there will be only 10 of such reports generated, and the method 200 can determine, with a high degree of confidence, that somewhere between about 5 and about 15 such reports will be generated.

At a sub-step 212(c), the method 200 conducts a probabilistic activity (i.e., it does the computer equivalent of rolling dice), to determine, for each such machine 130, whether or not to generate a problem message 140. Each such machine 130 might individually conduct the identical probabilistic activity. This has the effect that the actual number of machines 130 generating a problem message 140 will follow a binomial distribution, with a peak at 10 such reports and a high degree of confidence that somewhere between about 5 and about 15 such reports will be generated.

At a sub-step 212(d), only those machines 130 which successfully pass the probabilistic activity, (i.e., for a 1% chance, only about 1% of those machines 130), actually generate a problem message 140.

At a step 213, the method 200, at each such machine 130, determines the "next" such machine 130 to which to send the problem message 140. The "next" such machine 130 to which to send the problem message 140 is described in further detail herein at the section "Message Orbits".

At a step 214, the method 200, at each such machine 130, sends the problem message 140 to the "next" such machine 130. This has the effect that there will (most likely) be several such problem messages 140 present in the network 110 at any selected time, possibly distributed widely or possibly concentrated within a particular region or a particular configuration for each machine 130.

Evaluating Problems

Reaching the flow point 220 indicates that the "next" such machine 130 received the problem message 140.

At a step 221, the method 200, at each "next" such machine 130, evaluates its own local state, with the effect of determining if the problem is also present at that next such machine 130.

At a step 222, the method 200, at each "next" such machine 130, updates the parameters of the problem message 140, and possibly helping variables, to indicate that the problem has, more or less confidence that the problem has a prevalence with exceeds the selected threshold.

At a step 223, the method 200, at each "next" such machine 130, determines if the parameters of the problem message 140 indicate that the problem is, with relatively high confidence, either clearly absent, clearly present, or has its absence or presence still unclear.

This has the effect that the method 200, at each machine 130 generating a problem message 140, sends that problem message 140 to only one "next" machine 130. This has the effect that each single problem message 140, once generated, must survive scrutiny by a sequence of machines 130 to determine if the problem reported in that problem message 140 is sufficiently prevalent (more precisely, that there is a sufficient degree of confidence that the prevalence exceeds a selected threshold) for that problem to be reported to the receiver/server 150. Each machine 130 need look only at its own knowledge, e.g., its own local state, to provide information regarding whether the problem is sufficiently prevalent. This has the effect that the number of such problem messages 140 can be relatively limited, while still assuring that a problem that is relatively prevalent will survive the scrutiny of multiple such machines 130.

Each machine 130 receives a problem message 140 from its predecessor machine 130. Each machine 130 then adjusts the confidence that the prevalence of that problem, as reported in the problem message 140, exceeds a selected threshold. For example and without limitation, if, in a network 110 having 100,000 machines 130, the selected threshold of prevalence is that 1,000 machines 130 have the described problem, each problem message 140 will have its confidence value adjusted up or down by each receiving machine 130, in sequence, until a sequence of such machines 130 have concluded that the confidence that the prevalence is at least 1% is either sufficiently low (less than 5%) or sufficiently high (more than 95%).

The confidence value associated with the problem message 140 typically reaches one or the other threshold relatively quickly. However, in the event that a problem message 140 maintains a confidence value near a threshold for a sufficiently large number of hops, the receiving machine 130 applies a similar treatment to the problem message 140 as it would if the threshold were met, but informs the receiver/server 150 of the distinction between conditions.

In the context of the invention, there is no particular requirement for requiring the use of these particular stated values for confidence thresholds, or for any constant threshold, or for the particular confidence update techniques described herein, or in the Technical Appendix. The concepts of the invention, as shown by the embodiments described herein, are broad; many alternative embodiments are within the scope and spirit of the invention.

If the problem is, with relatively high confidence, clearly absent, the method 200 performs the step 224, where it discards the "problem" and creates a log entry for that "problem". This has the effect that the "problem" has been determined to be a "not-real" problem.

If the problem is, with relatively high confidence, clearly present, the method 200 performs the step 225, where it generates a report message 140 for the receiver/server 150. This has the effect that the "problem" has been determined to be a "real" problem.

If the problem has its absence or presence still unclear, the method 200 performs the step 226, where it makes a further check for those problems which remain near its reporting threshold for a relatively long time. This has the effect that problem messages 140 are terminated relatively quickly (i.e., more quickly than they would ordinarily be terminated by statistical update).

At the step 226, the method 200 determines if the problem message 140 has been near its reporting threshold for a relatively long time. For example and without limitation, the method 200 might examine the reporting parameter for the problem message 140, and in conjunction with a hop count for the number of machines 130 which have seen that particular problem message 140, determine whether the problem message 140 has been near its reporting threshold for "too long". If so, the method 200 proceeds with the step 225, i.e., it treats the problem as if it were a "real" problem. If not, the method 200 proceeds with the step 227.

At a step 227, the method 200 adjusts the parameters of the problem message 140, as described herein. The method 200 then proceeds with the earlier step 213, where it identifies the "next" machine 130 to which to send the problem message 140.

Message Orbits

The method 200 uses a technique which is locally substantially arbitrary within the network 110, but which exhibits global locality within the network 110, and which imposes a relatively small degree of resource consumption on each such machine 130 in the network 110. For example and without limitation, machines may be ordered in response to an arbitrary, yet substantially unique, aspect, e.g., their IP (Internet Protocol) address. In such examples, when a machine decides to spawn or propagate a message to a "next" machine, it might choose the available machine with the next-higher (or if that machine is not available, the next-next-higher, and the like) IP address as the destination of the message it is about to send.

This has the effect that machines in a relatively local network, e.g., a LAN, a wireless network, a VLAN, or even a campus-wide network or a subnet in a relatively large enterprise network, will be much likelier to choose a destination machine that is relatively local, but is otherwise substantially arbitrary in the nature of its choice. These examples exhibit both "local randomness", in the sense that when messages are sent from a first machine to a second machine that has a relatively local IP address, the particular second machine selected is substantially random within a relatively local cluster of machines. These examples also exhibit "global locality", in the sense that when messages are sent from a first machine to a second machine that has a relatively local IP address, the particular second machine selected is substantially likely to be relatively local to the first machine.

However, notwithstanding these features of local randomness and global locality, these examples exhibit a possible technique by which all machines in the network will eventually be included in an orbit for the message.

Message Parameters

Each problem message 140 thus includes an identification of the type of problem and information regarding at least the believed prevalence—more precisely, the level of confidence is less than a lower threshold (5%), and the level of confidence is more than a higher threshold (95%), that the prevalence exceeds the threshold of sufficient importance selected by one or more authorized users 153.

While this application primarily describes techniques in which the lower threshold is about 5% and the higher threshold is about 95%, there is no particular reason to limit the invention in this regard. For example and without limitation, a preferred technique is to adjust, over time, the lower and higher thresholds toward each other, e.g., the lower threshold would be adjusted toward 50% and the higher threshold would be adjusted toward 50%. This would make it more likely, over time, that a particular problem message 140 would be accepted as meeting the higher threshold (which might have been reduced to about 70%, or some other value, when that occurs) or rejected as meeting the lower threshold (which might have been increased to 30%, or some other value, when that occurs).

While this application primarily describes techniques in which the lower threshold and the higher threshold are adjusted toward each other using 50% as a delimiter, there is no particular reason to limit the invention in this regard. For some examples and without limitation, it might occur that only one of the thresholds is adjusted, it might occur that some other value, e.g., 75% is used as the delimiter (which would for example have the effect that the higher threshold would be reduced toward 75%, not below, and that the lower threshold would be increased toward 75%, not above), or it might occur that the thresholds are adjusted toward each other using another method for determining how much to move those thresholds and what value the delimiter (which might be chosen dynamically) might be. For example and without limitation, the lower threshold might be increased roughly twice as fast toward the higher threshold, while the higher threshold is decreased toward the lower threshold in proportion to the difference between them. This would have the effect that there would be no specific value that might act as a clearly selected delimiter, and would have the effect that the thresholds would be adjusted toward each other by amounts that would not easily be predicted ahead of time.

Each problem message 140 might also include one or more of: a measure of believed severity, a measure of believed malevolence, and a measure of believed damage likely to be caused, for the problem. When the problem message 140 is initially generated, the initial believed prevalence is set to a selected value. The selected value might be an initial degree of confidence showing that only one machine 130 has positively identified the problem. The selected value might also or instead be different in response to one or more of: a measure of believed severity, a measure of believed malevolence, and a measure of believed damage likely to be caused, for the problem.

As each individual problem message 140 propagates through its orbit of machines 130, each such machine 130 conditionally adjusts that problem message 140 in response to its own knowledge, e.g., its own local state, and in response to statistical methods as described herein. Each machine 130 continues to propagate its received individual problem message 140 only if that machine believes the prevalence to meet at least a selected standard—more precisely, that the level of confidence that the prevalence is greater than a selected amount by more than a selected lower threshold (5%, or a different value, as described above). This has the effect that each such problem message 140 is very likely to be discarded if the real prevalence is relatively low (lower than the threshold of sufficient importance selected by one or more authorized users 153), and likely to be propagated to result in a report to the receiver/server 150 if the real prevalence is relatively high (higher than that same threshold of sufficient importance).

For example and without limitation, in a network with 100,000 machines 130, one or more authorized users 153 might set the threshold of sufficient importance to be a prevalence of 250 such machines 130, i.e., ¼ of 1% of machines 130 in the network 110. Even when the threshold of sufficient importance is set so relatively low, the method 200 can assure with relatively high confidence that the receiver/server 150 will receive, say, at least 3 such report messages 140, and with relatively high confidence that the receiver/server 150 will receive between, say, 5-15 such report messages 140.

After the step 226, the method 200 performs the step 228.

At a step 228, the method (possibly) sends a report message 140 to the receiver/server 150. To perform this step, the method performs the following sub-steps:

At a sub-step 228(*a*), the method 200 determines, in response to the believed prevalence of the problem, statistically how many such machines 130 are likely to be ready to send a report message 140 to the receiver/server 150. Similar to the number of machines 130 which are likely to actually have the problem, the probability, for each particular machine 130, that the particular machine 130 is ready to send a report message 140 to the receiver/server 150, has a known distribution. For example and without limitation, this known distribution might have a peak at the value (number of machines testing)×(probability of each such machine noticing that problem).

At a sub-step 228(*b*), if the peak value noted in the step 228 is "too large", i.e., that the number of such machines 130 likely to be ready to send a report message 140 to the receiver/server 150, would swamp the receiver/server 150 with messages, the method 200 selects a fractional value of those report messages 140 to actually be sent. For example and without limitation, if it is desired that the receiver/server 150 receive between, say, 5-15 such report messages 140, and the likely number of such report messages 140 is close to 10,000, the method 200 selects the a fractional value between about $5/10{,}000$ and about $15/10{,}000$, e.g., $1/1{,}000$.

At a sub-step 228(*c*), the method 200 selects, at each such machine 130 ready to send such a report message 140, a random or pseudorandom value. The method 200 compares the random or pseudorandom value with the fractional value from the sub-step 228(*b*), with the effect that each such machine 130 ready to send such a report message 140 has only that fractional value as a probability of actually sending its report message 140. This has the effect that the number of report messages 140 actually received by the receiver/server 150 is very likely between the target values of say, about 5-15 such report messages, and also, that the likelihood that say, at least 3 such report messages 140 are actually received by the receiver/server 150 is quite high, e.g., a 99% confidence level.

At a sub-step 228(*d*), the method 200 causes each such machine 130 ready to send a report message 140 to be sent in response to the comparison of the previous step 228(*c*), with the effect that a "reasonable" number of such report messages 140 are sent to the receiver/server 150.

This has the effect that the method 200, from the set of machines 130, delivers only about O(i), i.e., a substantially constant, number of report messages 140 to the receiver/server 150, even when there are O(n), i.e., a number approximately proportional to n, where n=the number of machines 130 in the network 110, number of machines 130 able to detect that problem. For example and without limitation, even in a network with 100,000 nodes, the method 200 can assure with relatively high confidence that the receiver/server 150 will receive, say, at least 3 such report messages 140, and with relatively high confidence that the receiver/server 150 will receive between, say, 5-15 such report messages 140.

Identifying Reasons

Reaching the flow point 230 indicates that the method 200 has sent at least one such report message 140 to the receiver/server 150.

At a step 231, the method 200, at each machine 130 which has sent a report message 140 to the receiver/server 150, selects a possible cause for that problem. The possible cause might be any aspect of the machine 130 which sent the report message 140, which has any reasonable chance of being correlated with the problem. Since causes of computer problems can be quite broad and subtle, nearly any aspect of the machine 130 which sent the report message 140 might be selected. This has the effect that the machine 130 might select any feature of its own configuration, whether hardware or software, and whether a temporary measurement or not.

At a step 232, similar to the step 212, the method 200 (possibly) generates, at each machine 130 that has selected a feature as a possible cause, a reason message 140. As described herein, the reason message 140 includes any association of a particular machine state of the machine 130 generating that problem message 140, as a possible "cause" of the problem. As described herein, in the context of the invention, there is no particular requirement of actual causality, merely that the "cause" and the "problem" be somehow associated statistically. This has the effect that authorized users 153 might use information generated by the system 100 with respect to the "cause" of a "problem" to determine factual statements about the system which are useful in diagnosing and fixing actual errors and their causes.

This has the effect that the method 200, at each machine 130 generating a reason message 140, sends that reason message 140 to only one "next" machine 130. This has the effect that each single reason message 140, once generated, must survive scrutiny by a sequence of machines 130 to determine if the reason reported in that reason message 140 is sufficiently associated with its stated problem—more precisely stated with respect to equation (299) herein—for that problem to be reported to the receiver/server 150. Each machine 130 need look only at its own knowledge, e.g., its own local state, to provide information regarding whether the reason is sufficiently associated with the problem. This has the effect that the number of such reason messages 140 can be relatively limited, while still assuring that a reason that is relatively well-associated with a problem will survive the scrutiny of multiple such machines 130.

Each machine 130 receives a reason message 140 from its predecessor machine 130. Each machine 130 then adjusts the confidence that the reason is associated with its stated problem, in accord with equation (299) herein. In the context of the invention, there is no particular requirement for requiring the use of these particular stated values for confidence thresholds, or for any threshold of association between the reason and the problem, or for the particular confidence update techniques described herein, or in the Technical Appendix. The concepts of the invention, as shown by the embodiments described herein, are broad; many alternative embodiments are within the scope and spirit of the invention.

As described above, the step 232 is similar to the step 212, at least in that the method 200 might engage in the same type of statistical determination as described with respect to the step 212. This has the effect that, when a report message 140 has been sent to the receiver/server to report a problem, it is likely, but not 100% guaranteed, that the machine 130 sending the report message 140 will generate a reason message 140 to go with the problem message 140. As described herein, the machine 130 sending the report message 140 is set to be relatively more likely to generate a reason message 140 than a machine 130 identifying a problem is set to be likely to generate a problem message 140, because the number of machines 130 generating report messages 140 has been statistically adjusted to be, say, between 5-15 such machines 130, rather than the possible 250 or 1,000 such machines 130 as described in examples described herein.

At a step 233, similar to the step 213, the method 200, at each such machine 130, determines the "next" such machine 130 to which to send the reason message 140. As described with respect to the step 213, the "next" such machine 130 to which to send the reason message 140 is described in further detail herein at the section "Message Orbits".

At a step 234, similar to the step 214, the method 200, at each such machine 130, sends the reason message 140 to the "next" such machine 130. As described with respect to the step 214, this has the effect that there will (most likely) be several such reason messages 140 present in the network 110 at any selected time, possibly distributed widely or possibly concentrated within a particular region or a particular configuration for each machine 130.

Evaluating Reasons

Reaching the flow point 240 indicates that the "next" such machine 130 received the reason message 140.

The steps 241 through 249 are similar to the steps 221 through 229, at least in that the method 200 attempts to determine whether the reason described in the reason message 140 is in some way statistically relevant to the problem described in the (problem) report message 140. The computations desirable to make a statistical determination of relevance between a suspected cause and a known problem are somewhat different from the computations desirable to make a statistical determination of whether a suspected problem is a "real" problem or a "not-real" problem.

Accordingly, reason messages 140 include slightly different information from problem messages 140, at least in that they describe both the problem and the reason, and that they describe distinct statistical measures (and distinct statistical helping values carried along with the message 140). As described herein, one way to describe the statistical likelihood of a reason being "really", versus "not-really", associated with its stated problem, is to measure the confidence level that the reason message 140 describes a reason that is sufficiently associated with its stated problem to exceed a selected threshold for reason/problem association of interest to the system 100.

At a step 241, similar to the step 221, the method 200, at each "next" such machine 130, evaluates its own local state, with the effect of determining if the cause, or the problem, or both or neither, are also present at that next such machine 130.

At a step 242, the method 200, at each "next" such machine 130, updates the parameters of the reason message 140, and possibly helping variables, to indicate that there is more or less confidence that the reason is associated with the problem at more than a selected threshold.

As described herein, for reason messages 140, one statistic that might be maintained is a confidence relating to the difference $$\text{Pr(problem|suspected cause)} - \text{Pr(problem|absence of suspected cause)}, \quad (299)$$

where Pr(A|B) represents a probability of A being true, conditional on B being true.

This has the effect of identifying those causes which are, not merely associated with the problem, as many possible causes will be both associated with the problem and also associated with virtually every problem, but more clearly distinct as being associated with a distinction between the presence versus absence of the problem. However, in the context of the invention, there is no particular requirement for using the particular conditional probability measure as described in equation (299); many alternatives are within the scope and spirit of the invention.

It would be possible to merge the nature of the problem message 140 and the reason message 140, and use a statistical measure that would be appropriate for both. For example and without limitation, the problem message 140 might be restated as a reason message 140 with no particular reason associated with its stated problem. However, in the context of the invention, there is no particular requirement for any such thing, or for the particular example given here.

Each machine 130 receives a reason message 140 from its predecessor machine 130. Each machine 130 then adjusts the confidence statistic, as described in equation (299), or as otherwise used in other cases, regarding whether the reason is statistically likely to be associated with the problem. For example and without limitation, if the selected threshold described in equation (299) is 70%, i.e., Pr(problem|suspected cause) is 70% or more greater than Pr(problem|absence of suspected cause), the confidence statistic would measure the confidence that the difference between those values is more than 70%.

At a step 243, similar to the step 223, the method 200, at each "next" such machine 130, determines if the parameters of the problem message 140 indicate that the reason is, with relatively high confidence, either clearly not associated with the problem, clearly associated with the problem, or has its association with the problem still unclear.

If the reason is, with relatively high confidence, clearly not associated with the problem, the method 200 performs the step 244, similar to the step 224, where it discards the "cause" and (possibly) creates a log entry for the combination of that cause and that problem. This has the effect that the "cause" has been determined to be "not-really" associated with the problem. The method 200 delivers the message 140 to an agent to (possibly) send that message 140 to the receiver/server. The method 200 then proceeds with the step 231, at which it selects a new possible cause that might be associated with the problem.

If the reason is, with relatively high confidence, clearly associated with the problem, the method 200 performs the step 245, similar to the step 225, where it generates a report message 140 for the receiver/server 150. This has the effect that the "cause" has been determined to be "really" associated with the problem. Upon sending such a report message 140, the method 200 proceeds either with the flow point 230, where it attempts to identify another reason individually associated with the problem, or proceeds with the flow point 250, where it attempts to identify a second reason, jointly with the first reason associated with the problem.

If the reason has its association with the problem still unclear, the method 200 performs the step 246, similar to the step 226, the method 200 determines if the reason message 140 has been near its association threshold for a relatively long time. For example and without limitation, the method 200 might examine the reporting parameter for the problem message 140, and in conjunction with a hop count for the number of machines 130 which have seen that particular problem message 140, determine whether the problem message 140 has been near its reporting threshold for "too long". If so, the method 200 proceeds with the step 245, i.e., it treats the reason as if it were a "real" reason. If not, the method 200 proceeds with the step 247.

At a step 247, similar to the step 227, the method 200 adjusts the parameters of the reason message 140, as described herein. The method 200 then proceeds with the earlier step 233, similar to the step 213, where it identifies the "next" machine 130 to which to send the problem message 140.

In the context of the invention, there is no particular requirement for requiring the use of these particular stated values for confidence thresholds, or for any constant threshold, or for the particular confidence update techniques described herein, or in the Technical Appendix. The concepts of the invention, as shown by the embodiments described herein, are broad; many alternative embodiments are within the scope and spirit of the invention.

At a step 248, the method (possibly) sends a reason message 140 to the receiver/server 150. This step is similar to the step 228, described above.

The step 248 is also similar, at least in that the method 200 might engage in the same type of statistical determination as described with respect to the step 227 and the step 228. This has the effect that, when a reason is identified with a problem, the number of report messages 140 to be sent to the receiver/server 150 is desired not to be "too large", wherein the receiver/server 150 would be swamped with such messages. Accordingly, the method 200 performs a similar statistical operation, with the effect that approximately, say, 5-15 such reason reports are sent to the receiver/server 150, and that at least, say, 3 such reason reports are sent to the receiver/server 150 with relatively high confidence.

As noted herein, the method 200 might proceed with the flow point 230, where it would attempt to determine a second cause that is individually associated with the problem, or might proceed with the flow point 250, where it would attempt to determine a second cause that is, jointly with the first cause, associated with the problem. As the techniques for determining a second cause that is, jointly with the first cause, associated with the problem, i.e., a "joint cause", are similar to the techniques for determining the first cause individually associated with the problem, they are not described in detail at this point.

However, after reading this application, those skilled in the art would recognize that with application of appropriate statistical update techniques, determining joint causes is similar to determining individual causes, would not require undue experimentation or further invention, and is within the scope and spirit of the invention.

"Real" and "Not Real" Problems

We consider at least an initial suspected problem, and a message spawned in response thereto. The message includes information reporting on aspects of the problem (such as its possible prevalence, severity, malevolence, and damage), and a confidence level associated with that reported prevalence.

A "real" problem might (ultimately) be successfully resolved to be a "real" problem, in at least the sense that at least one machine 130 sends a report message 140 to the receiver/server 150. The system 100 is disposed so that "real" problems are successfully resolved to be "real" problems with substantially high probability. Alternatively, a "real" problem might (ultimately) be (wrongly) resolved to be a "not-real" problem, in at least the sense that no machine 130 sends a report message 140 to the receiver/server 150. The system 100 is disposed so that "real" problems are wrongly resolved to be "not-real" problems with substantially low probability.

It appears to be advantageous to adjust the statistical behavior of the machines 130 so that there is a mean of about 20 such machines 130 reporting to the receiver/server 150. It also appears to be advantageous to adjust the statistical behavior of the machines 130 so that there is about a 99% confidence that at least 3 such machines 130, somewhere in the network 110, will report to the receiver/server 140. However, in the context of the invention, there is no special requirement for that mean to be about 20, or the confidence to be 99%, or that the target minimum number of machines 130 must be at least 3. These values could be varied substantially while remaining within the scope and spirit of the invention.

A "not-real" problem might (ultimately) resolved to be a "not-real" problem, in at least the sense that no machine 130 sends a report message 140 to the receiver/server 150, e.g., because no report is necessary or possibly even desirable. The system 100 is disposed so that "not-real" problems 301 are successfully resolved to be "not-real" problems with substantially high probability. Alternatively, a "not-real" problem might (ultimately) be (wrongly) resolved to be a "real" problem, in at least the sense that one or more machines 130 send a report message 140 to the receiver/server 150. The system 100 is disposed so that "not-real" problems are wrongly resolved to be "real" problems with substantially low probability.

FIG. 3

Figure 3:
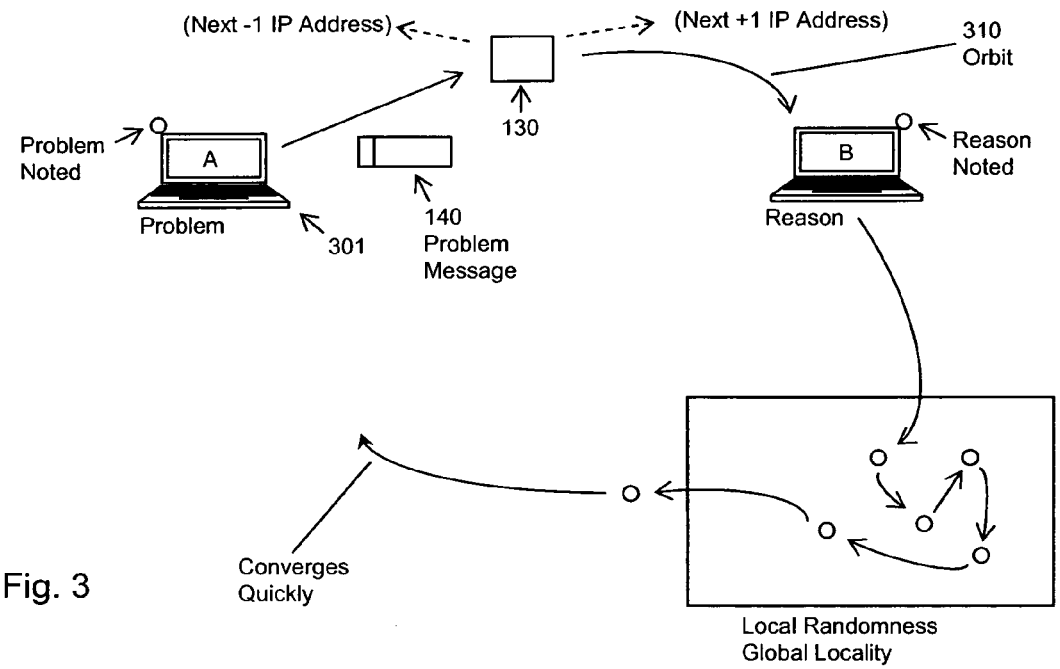
FIG. 3 shows a conceptual drawing of a message distribution channel.

FIG. 3 shows a conceptual drawing of a message distribution channel used by techniques described above, including elements in the figure, and including at least an initiator 301 of a problem message 140, an initiator 301 of a reason message 140, and an orbit 310 through which such messages 130 are sent.

Non-multicast. The system 100 does not need to multicast its messages 130, as it is contemplated that there will be a number of initiators 301 for problems that have relatively high prevalence, and that their associated problem messages 140 will be propagated along the orbit 310 with relatively high confidence. Similarly, it is contemplated that there will be a number of initiators 301 for hypotheses relating to such problems, and that their associated reason messages 140 will be propagated along the orbit 310 with relatively high confidence (if they are in fact causes that are associated with those problems).

Local randomness, global locality. The system 100 determines, for each machine 130, to which other machine 130 to send to next. Messages 130 propagate relatively locally with relatively high probability, and propagate relatively nonlocally with relatively low, but nonzero, probability. This allows machines 130 to use only a relatively small amount of the bandwidth resources available from the network 110, while achieving an adequate mixture of relatively local and relatively nonlocal hops. However, in the context of the invention, there is no special requirement for messages 140 to propagate locally or nonlocally, so long as messages 140 relating to relatively widely-distributed problems (e.g., those which are severe but not necessarily very prevalent) are capable of being substantially propagated to a relatively wide mixture of machines 130.

Selection Technique. The system 100 selects an orbit 310 with the effect that, for each machine 130, the next machine 130 in the orbit 310 is the machine 130 with the next-higher IP address. Exactness is not required. This relatively-simple technique is sufficient to select an orbit 310 with adequate properties of local randomness and global locality, while using a relatively low amount of computing resources from each machine 130.

When a "new" machine 130 couples to the network 110, it queries at least some known other machines 130 (multicast messages might be appropriate here) to determine their IP addresses. Each machine 130 maintains a record of the IP addresses of its own neighbors, with the effect that a "new" machine 130 can relatively quickly find its position in the orbit 310. In the context of the invention, there is no special requirement for using IP addresses; any other identifier would also be within the scope and spirit of the invention, as would a completely or partially probabilistic technique for selecting the next machine 130 in the orbit 310.

When an "old" machine 130 is about to decouple from the network 110, it identifies the one "previous" other machine 130 in the orbit 310 and the one "next" machine 130 in the orbit 310, and informs those machines 130 that they are now neighbors (effective when the "old" machine 130 decouples from the network 110).

FIG. 4

Figure 4:
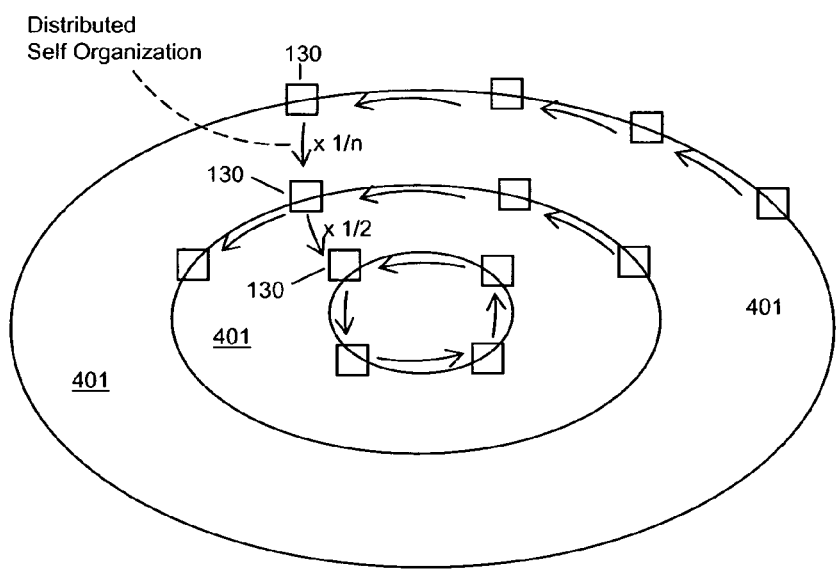
FIG. 4 shows a conceptual diagram of a technique for self-organization of machines in the network.

FIG. 4 shows a conceptual diagram of a technique for self-organization of the machines 130 in the network 110, including elements in the figure, and including at least a first ring 401 of machines 130, a second ring 401 of machines, and the like. One can see that this allows the machines 130 to self-organize, without any substantial nonlocal message-passing, into a number of rings 401 in O(log n) time, where n is the number of machines 130 coupled to the network 110.

Each machine 120 in the self-organizing network 110 maintains a record of its nearest neighbor in each ring 401. This has the effect that a path can be traced relatively quickly, e.g., in O(log n) time, where n is the number of machines 130 coupled to the network 110, from any one machine 130 to any other machine 130 coupled to the network 110. For example, a starting machine 130 can trace a path to an ending machine 130 relatively quickly by sending a message to its nearest neighbor in the inmost ring 401, or alternatively to its nearest neighbor in the next-higher ring 401, with the effect that messages 140 can be propagated relatively quickly and with relatively minimal use of bandwidth resources.

Alternative Embodiments

One reading this application would immediately recognize a wide variety of alternative embodiments, all of which are within the scope and spirit of the invention.

TECHNICAL APPENDIX

This application includes, and incorporates by reference, a Technical Appendix including at least these documents:
A two-page paper including sections "I. Overview", "II. Topology", "III. Communication", and "IV. Triggers".
A 27-page paper including Beta Integrals and some derivations therefrom.
An eight-page paper titled "The Tanium Design", dated Nov. 17, 2008.

The invention claimed is:

1. A method, including steps of generating a problem message by a machine in a network to be monitored;

by each one of a plurality of machines in said network conditionally passing said problem message onward within said network, each machine passing said message onward doing so in response to a probabilistic activity:

each machine passing said message onward conditionally adjusting said message in response to a local state at said particular machine;

from one or more machines in said network, reporting said problem message to a device external to said network;

wherein said device external to said network receives a set of messages describing a global state of said network with respect to a problem associated with said problem message.

2. A method as in claim 1, wherein said steps of conditionally passing said problem message onward transfer local state information about a $1^{st}$ machine, from said $1^{st}$ machine to a $2^{nd}$ machine, when said problem message is passed onward;

said problem message collects nonlocal status information about said network while transferring substantially only said local information from each said $1^{st}$ machine.

3. A method as in claim 1, including steps of injecting one or more copies of a new problem message into said network, each said copy be ing injected at a distinct machine within said network;

passing said new problem message onward within said network substantially as if generated by machines in said network.

4. A method as in claim 1, wherein said steps of reporting said problem message to a device external to said network are performed conditionally, responsive to a probabilistic activity.

5. A method as in claim 1, including steps of in response to a problem message, generating a reason message by a machine in a network to be monitored;

by each one of a plurality of machines in said network, conditionally passing said reason message onward within said network, each machine passing said message onward doing so in response to a probabilistic activity;

each machine passing said reason message onward conditionally adjusting said reason message in response to a local state at said particular machine;

from one or more machines in said network, reporting said reason message to a device external to said network.

6. A method as in claim 1, including steps of injecting one or more copies of a command into said network, each said copy being injected at a distinct machine within said network;

passing said command onward within said network;

when said command designates characteristics of said particular machines in said network, performing said command at said particular machines in said network.

7. A method as in claim 1, including steps of injecting one or more copies of a query into said network, each said copy being injected at a distinct machine within said network;

passing said query onward within said network;

when said query designates characteristics of said particular machines in said network, performing said query at said particular machines in said network, and reporting results of said query for one or more said particular machines to said device external to said network.

8. Apparatus including a set of machines in a network to be monitored, each particular machine including a problem message generator, said problem message generator responsive to a local state of said particular machine and to a probabilistic activity:

an input port capable of receiving a message, a sensor capable of determining a state of said apparatus, a message editor, coupled to said sensor, capable of adjusting said message, a message evaluator, coupled to said message, capable of conditionally determining whether said message should be passed onward;

an output port, responsive to said message editor, said message editor a probabilistic activity, and responsive to said message evaluator, said message evaluator responsive to a probabilistic activity;

one or more said machines being coupled to a device external to said network, said device external to said network being responsive to one or more problem messages, said one or more problem messages describing a global state of said network with respect to a problem associated with said problem message.

9. Apparatus as in claim 8, wherein said output port is coupled to local state information about a $1^{st}$ machine, and to a $2^{nd}$ machine;

said problem message includes nonlocal status information about said network.

* * * * *